United States Patent
Kobayashi

Patent Number: 6,078,798
Date of Patent: Jun. 20, 2000

[54] RADIO RECEIVER WITH OBJECT STATION SENSITIVITY

[75] Inventor: Keiji Kobayashi, Oizumi-Machi, Japan

[73] Assignee: Sanyo Electric Co., Ltd., Osaka, Japan

[21] Appl. No.: 09/049,876

[22] Filed: Mar. 27, 1998

[30] Foreign Application Priority Data

Mar. 31, 1997 [JP] Japan ................................. 9-081473

[51] Int. Cl.$^7$ ................................................. H04B 1/06
[52] U.S. Cl. .................... 455/254; 455/250.1; 455/295
[58] Field of Search ........................... 455/254, 250.1, 455/295, 296, 232.1, 234.1, 234.2; 375/345

[56] References Cited

U.S. PATENT DOCUMENTS

| | | | |
|---|---|---|---|
| 4,919,640 | 4/1990 | Yanagibori | 455/254 |
| 4,955,077 | 9/1990 | Sugayama | 455/197.1 |
| 5,339,453 | 8/1994 | Sugayama et al. | 455/254 |
| 5,339,454 | 8/1994 | Kuo et al. | 455/254 |
| 5,390,345 | 2/1995 | Wada et al. | 455/254 |
| 5,465,408 | 11/1995 | Sugayama et al. | 455/254 |
| 5,513,386 | 4/1996 | Ogino et al. | 455/254 |
| 5,722,060 | 2/1998 | Horigome | 455/254 |
| 5,761,614 | 6/1998 | Leitch et al. | 455/254 |
| 5,862,465 | 1/1999 | Ou | 455/254 |
| 5,940,143 | 8/1999 | Igarashi et al. | 455/254 |

*Primary Examiner*—Edward F. Urban
*Assistant Examiner*—Rafael Perez-Gutierrez
*Attorney, Agent, or Firm*—Cantor Colburn LLP

[57] ABSTRACT

In order to enhance an RF-AGC sensitivity when a station which may cause mutual modulation disturbance is detected, an automatic memory mode is executed so that data on the six stations with first to sixth highest field intensity are preset in a memory. When a receiver intends to receive an object station among the six preset stations, the differences in frequency between the object station and other preset stations are obtained, and whether or not the object station and each of the other stations retain such frequency relationship that may cause mutual modulation disturbance is detected, based on the frequency difference. With an expectation of mutual modulation disturbance, the RF-AGC is set to have higher sensitivity, while, without such expectation, it is set to have lower sensitivity.

10 Claims, 6 Drawing Sheets

RADIO RECEIVER WITH OBJECT STATION SENSITIVITY

BACKGROUND OF THE INVENTION

1. Field of the Invention

The present invention relates to a radio receiver comprising an RF-AGC loop and having an automatic memory function.

2. Description of the Related Art

In general, when a radio receiver receives a disturbance station "fud" having strong field intensity, in addition to a station "fd" which the receiver intends to receive (an object station), a harmonic is generated according to the non-linear element characteristics of an element used in an RF amplifier, and so on. In particular, if two disturbance stations "fud1," "fud2" (fud1<fud2) are present, and they hold the relationship "fd−fud1=fud1−fud2" with respect to an object station, as shown in FIG. 1, a harmonic due to the disturbance stations "fud1," "fud2," i.e., (2×fud1−fud2, fud2−2× fud1), will appear in the vicinity frequency of the object station. This harmonic may be transmitted via the receiver line to a detection stage, which may cause mutual modulation disturbance.

In order to solve this problem, conventionally, an RF signal level has been lowered according to received field intensity to thereby suppress generation of a harmonic and further to prevent occurrence of mutual modulation disturbance. FIG. 2 is a block diagram relative to a conventional radio receiver which is less affected by mutual modulation disturbance.

Referring to FIG. 2, a received RF signal of an object station is supplied to an RF amplifier 1 for amplifying, and then to an RF tuning circuit 2 for tuning. The RF tuning circuit 2 in turn outputs a signal into a mixing circuit 3, where the signal is converted through frequency conversion into an IF signal by a local oscillation signal supplied from a local oscillation circuit 4. The IF signal is supplied to an IF amplifier 5 for amplifying, and then to an FM detection circuit 6 for FM detection.

Then, if disturbance stations fud1, fud2 having strong field intensity are present, a field intensity detection circuit 7 outputs a high level signal into an RF-AGC circuit 8, so that the circuit 8 outputs a signal according to the field intensity. In response to this signal outputted from the circuit 8, the RF amplifier 1 controls its gain. Specifically, if the circuit 1 receives a signal higher than a predetermined level field intensity, the circuit 1 reduces its gain such that it reduces the gain more when it receives a signal indicating higher intensity.

In other words, when disturbance stations fud1, fud2 are received, the gain of the RF amplifier 1 is reduced, and the levels of the received RF signals of the disturbance stations fud1, fud2 are accordingly reduced until adverse effects by these disturbance stations fud1, fud2 are modified.

However, the presence of a disturbance station which has a close frequency to that of the object station, and does not hold the above mentioned relationship with an object station may lead to erroneous operation of the AGC loop. As a result, the level of an RF signal of the object station may be undesirably suppressed even when mutual modulation disturbance is not occurred.

SUMMARY OF THE INVENTION

The present invention has been conceived to overcome the above problems and aims to provide a radio receiver with excellent object station sensitivity.

In order to achieve the above object, according to the present invention, there is provided a radio receiver including an AGC loop reducing a level of an RF signal according to received field intensity, and a memory function storing data on a number of stations having field intensity at more than a predetermined level, comprising detection means for detecting a station having such frequency relationship with respect to an object station that may cause mutual demodulation disturbance with respect to the object station, based on frequency relationship among the number of stations; and sensitivity changing means for enhancing sensitivity of the AGC loop in response to an output signal of the detection means.

The detection means may include first calculation means for calculating and using as a first value, a frequency difference between the object station selected from among the number of stations and another station selected from among the number of stations; second calculation means for calculating and using as a second value, a frequency difference between the another station and yet another station selected from among the number of stations; and first determination means for determining whether or not the first value is equal to the second value, wherein the sensitivity of the AGC loop is enhanced when the first value is equal to the second value.

The detection means may further include third calculation means calculating and using as a third value, a frequency difference between the object station selected from among the number of stations, and another station selected from among the number of stations; fourth calculation means calculating and using as a fourth value, a frequency difference between the object station and yet another station selected from among the number of stations; and second determination means for determining whether or not the fourth value is twice as large as or half of the third value, wherein the sensitivity of the AGC loop is enhanced when the fourth value is twice as large as or half of the third value.

The detection means may still further include frequency detection means for detecting whether or not frequencies of the another station and the yet another station are both higher or lower than a frequency of the object station.

As described above, according to the present invention, an object station is selected from among a number of stations having field intensity at more than a predetermined level, and its data is stored. Any station which retains such relationship that it may cause mutual modulation disturbance to the object station is detected, referring to the frequency relationship between the object station and other stations of the number of stations. The sensitivity of an AGC loop for reducing the level of an RF signal according to the field intensity of a received signal is enhanced if any station which may possibly cause mutual modulation disturbance is detected.

BRIEF DESCRIPTION OF THE DRAWINGS

The above and the other objects, features, and advantages of the present invention will become further apparent from the following description of the preferred embodiment taken in conjunction with the accompanying drawings wherein.

DESCRIPTION OF THE PREFERRED EMBODIMENTS

Figure 2:
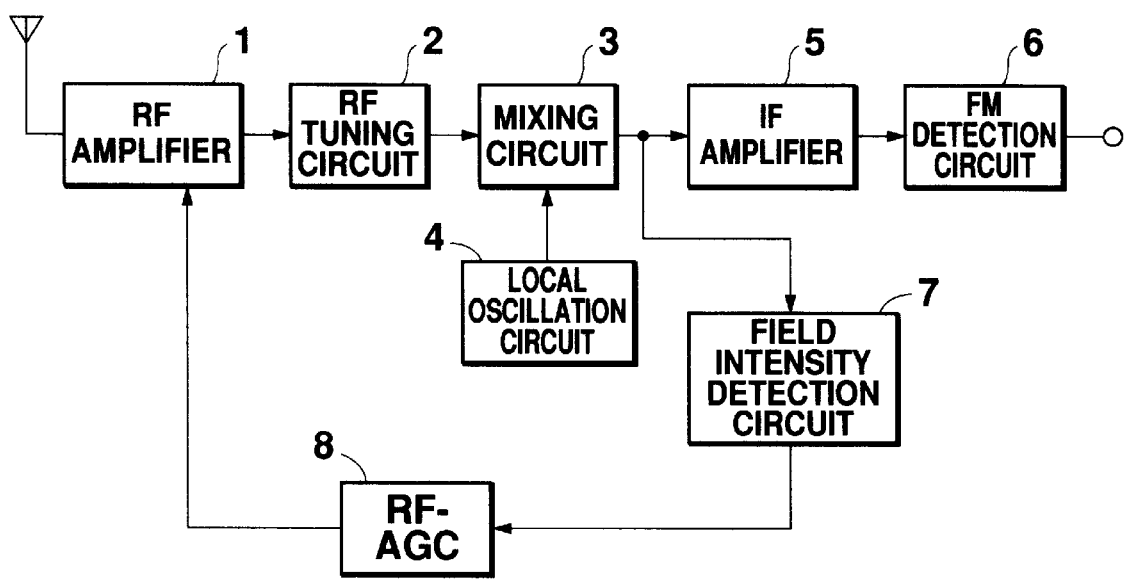
FIG. 2 is a block diagram relating to conventional radio receiver.
Figure 3:
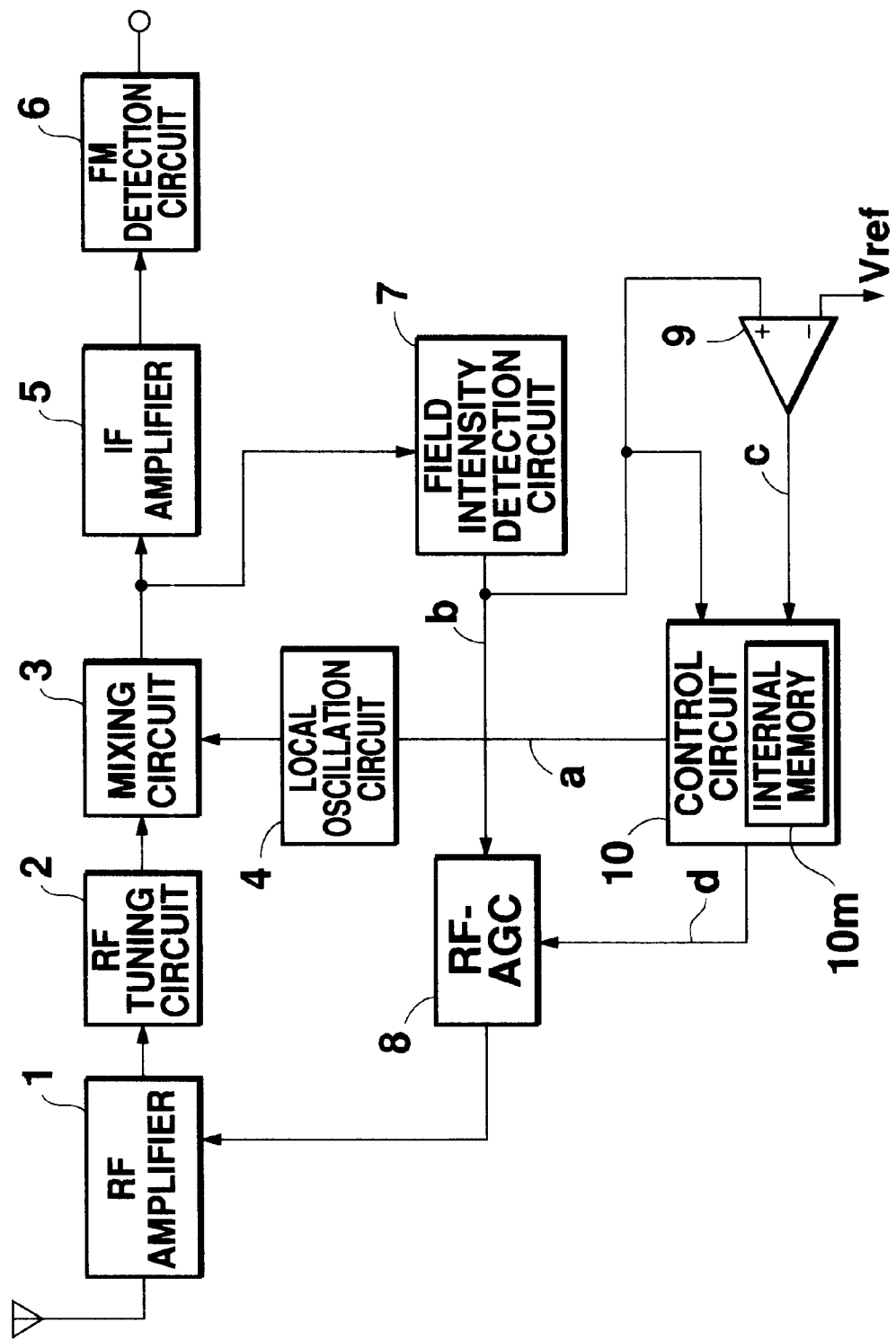
FIG. 3 is a block diagram relating to a radio receiver of the present invention.

Referring to FIG. 3, a radio receiver according to this embodiment of the present invention comprises a station detection circuit 9 and a control circuit 10. The station detection circuit 9 detects a station in response to an output signal of a field intensity detection circuit 7. The control circuit 10, comprising a micro computer or the like, controls the frequency of a local oscillation signal and the sensitivity of the RF-AGC circuit 8, and executes an automatic memory function. Identical structural elements to those of the conventional circuit of FIG. 2 are given identical reference numerals in FIG. 3, and their explanations are not repeated.

Figure 4:
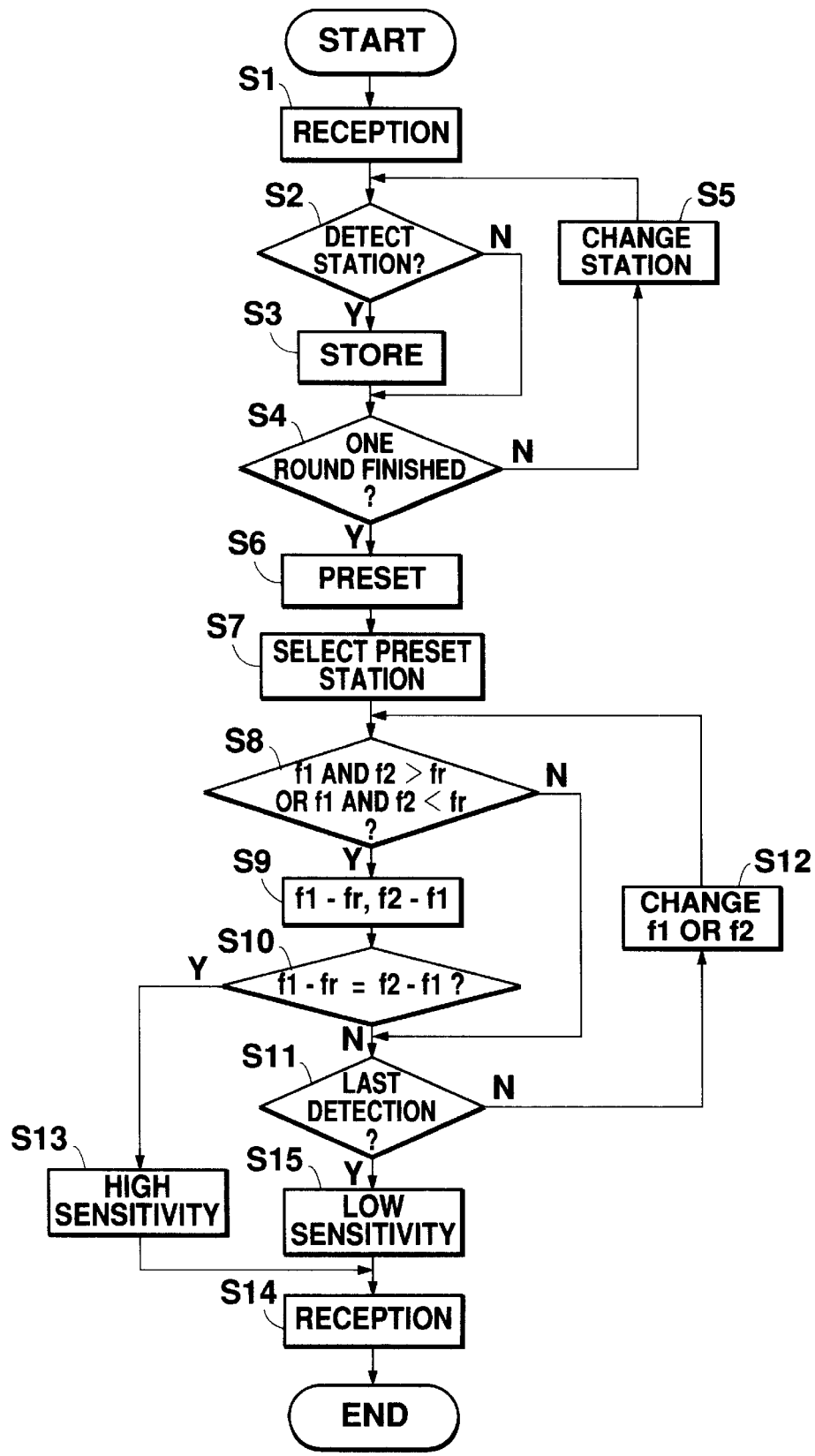
FIG. 4 is a flowchart of an operation of the device of FIG. 3.

In operation, referring to the flowchart of FIG. 4, the radio receiver of FIG. 3 initially executes an automatic memory function so that data on the stations having more than a predetermined level field intensity are stored in the order of higher intensity.

Specifically, the control circuit 10 generates a local oscillation control signal "a" so that a local oscillation signal is set to have a frequency "foscl" in response to the local oscillation control signal a. With this setting, the RF signal of a station "f1" is rendered to frequency conversion in the mixing circuit 3 and converted into an IF signal having a predetermined center frequency. In other words, only the station f1 is transmitted to the FM detection circuit 6, as a result of which the radio receiver is set in a mode of receiving the station f1 (S1).

With the receiver set in the mode of receiving the station f1, an output signal of the mixed circuit 3 is subjected to peak detection in the field intensity detection circuit 7 so as to determine the field intensity of the station f1. The circuit 7 then supplies a field intensity indication signal "b" into the station detection circuit 9 and the control circuit 10. The station detection circuit 9 compares a field intensity indication signal b with a reference level Vref, and generates a station detection signal "c" when the signal b indicates a higher level than the reference level Vref (S2).

Given that the station fl has strong field intensity and a station detection signal c is thus generated upon detection of the station f1, while the receiver is in the mode of receiving the station f1, the control circuit 10 operates such that the data about the received frequency and field intensity of the station f1 are stored in the internal memory 10m. Note that storing data on a received frequency in the internal memory 10m is achieved by storing data on a local oscillation control signal a in the internal memory 10m because each local oscillation control signal a corresponds to each received frequency. Also, data on the received field intensity is stored in the internal memory 10m after a field intensity indication signal b is converted into a digital signal through analog-digital conversion by the control circuit 10 (S3).

When either storage of data into the internal memory 10m is completed at S3, or a station detection signal c is not generated at S2, whether or not the search for receivable stations is completed from one end to the other end of the receiver band (S4) If it is not yet, the control circuit 10 changes a local oscillation control signal a so that a local oscillation signal is accordingly changed to have a frequency fosc2, with the frequency fosc2 relating to the station next to the station with the frequency foscl of all the stations receivable at that time. With this, the RF signal of a station f2 is converted into a predetermined IF signal through frequency conversion, as a result of which the radio receiver is set in a mode of receiving the station f2 (S5).

Given that a station detection signal c is generated upon detection of the station f2 while the receiver is in the mode of receiving the station f2, data on the received frequency and field intensity of the station f2 are stored in the internal memory 10m.

Figure 5:
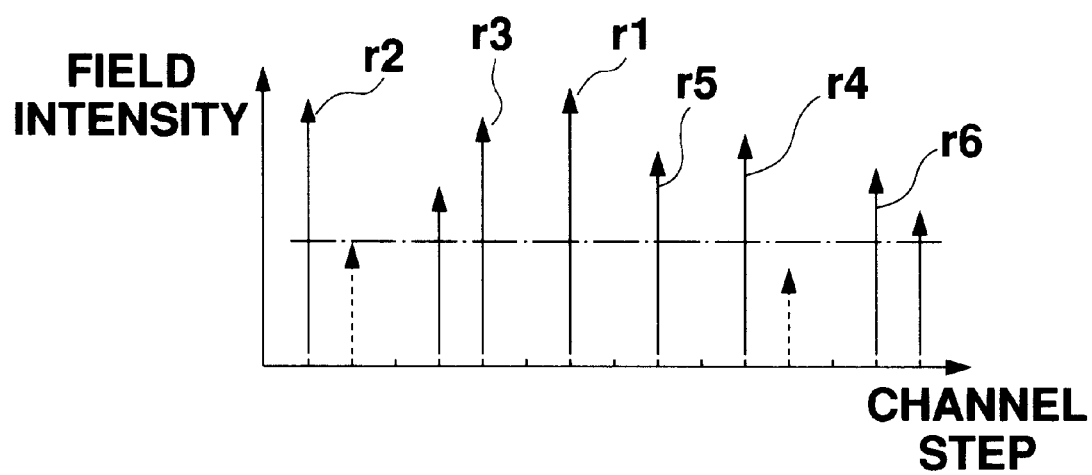
FIG. 5 is a diagram for explaining an operation for selecting a preset station by the device of FIG. 3.

The above process will be repeated until it is completed with respect to the last station having a frequency within the receiver band. Therefore, by the time of completing the above process with the last station, data on the frequencies and field intensity of all the then-receivable stations having field intensity greater than a predetermined value (see FIG. 5) are stored in the internal memory 10m. Referring to FIG. 5, data on the stations indicated by the solid line arrows are stored in the internal memory 10m, while those by the dotted line arrows are not as they do not need a predetermined level.

Subsequently, the control circuit 10 selects, for instance, six stations having the first to sixth highest field intensities from among the stations whose data has been acquired and stored in the internal memory 10m during the process S1 to S5, based on field intensity data. The control circuit 10 then presets the data on the six selected stations in a preset region in the internal memory 10m in the order of higher field intensity. That is, the preset region includes six subregions PR1 to PR6, and data on the station with the highest field intensity is stored in the subregion PR1; the station with the second highest field intensity is stored in the subregion PR2; and the same for the rest. In this manner, data on the stations having the first to sixth highest field intensity r1 to r6 of all the stations shown in FIG. 5 are preset in the subregions PR1 to PR6 in this order. Upon completion of a presetting process, the automatic memory process is completed (S6). Next, given that one of the six stations whose data are preset in preset subregions (preset stations) is selected as an object station. More particularly, given that the station r1 in FIG. 5, whose data is stored in the preset region PR1, is selected (S7). The control circuit 7 detects whether or not any other preset stations, namely stations r2 to r6, may cause mutual modulation disturbance with respect to the station r1.

Figure 1:
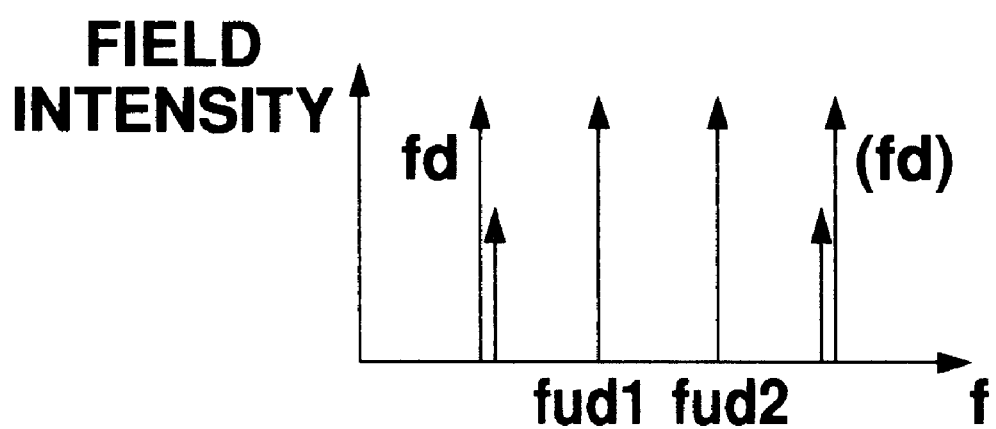
FIG. 1 is a diagram for explaining conventional mutual modulation disturbance.

For this purpose, frequency relationship between the station r1 and the stations r2, r3 is initially checked. That is, the control circuit 10 reads frequency data on the station r1 from the memory 10m as a reference frequency fr, that of the frequency r2 as a first frequency f1, and that of the frequency r3 as a second frequency f2. The circuit 10 then detects whether or not the relationship A "f1>fr, and f2>fr" or "f1<fr and f2<fr" holds among the stations r1, r2, r3 (S8). This detection is performed because, when disturbance stations fud1 and fud2 have the relationship A "fud1>fd, and fud2>fd" or "fud1<fd and fud2<fd" with respect to an object station fd, as shown in FIG. 1, those disturbance stations fud1, fud2 may cause mutual modulation disturbance to the object station fd, and detection as to whether or not this relationship A holds between object and disturbance stations may predict the possibility that the disturbance stations may cause mutual modulation disturbance to the object station. In the case that the detection turns out to negate the establishment of the relationship A, next detected is whether or not that detection is deemed to be the final one (described later).

In the above example of FIG. 5, since the first and second frequencies f1 and f2 are both lower than the reference frequency fr, the control circuit 10 initially calculates the difference in frequency between the reference frequency fr and the first frequency f1 and that between the first frequency f1 and the second frequency f2. The calculated difference between the reference frequency fr and the first frequency f1 is used as a first value (f1−fr), and that between the first frequency f1 and the second frequency f2 as a second value (f2−f1) (S9). The circuit 10 then compares the first and second values to see whether or not the relationship B "f1−fr=f2−f1" holds (S10).

Referring to FIG. 5, the horizontal axis for the channel tep is assigned a scale with equal intervals. As is obvious from FIG. 5, a frequency difference between the stations r1 and r2 is not equal to that of the stations r2 and r3. Thus, the control circuit 10 knows that the relationship B "f1−fr=f2−f1" does not hold. When the relationship B does not hold, or when it is detected at S8 that the relationship A does not hold, the control circuit 10 next detects whether or not the conducted detection as to frequency relationship is deemed to be the final one (S11).

If not, the control circuit 10 reads frequency data on the station r4 and uses that data for a second frequency f2, instead of the station r3 (S12). Returning to SB, the control circuit 10 checks the frequency relationship between the stations r1 and r2, and r1 and r4. That is, whether or not the first and second reference frequencies f1 and f2 are both either higher or lower than the reference frequency fr is detected. When they are, i.e., when they retain the relationship A, the first value (f1−fr) and the second value (f2−f1) are calculated, and whether or not the first and second values retain the relationship B is detected at S10.

If not, frequency data concerning another station is read from the next preset subregion and is used as a second frequency f2 in further detection as to the relationship A and B. In this manner, the detection will be repeatedly conducted, while sequentially substituting the data about all the rest selected frequencies to a second frequency f2 until the data stored in the preset subregion PR6.

When the above detection procedure prevails no frequency which holds the relationship A or B, the data stored in the preset subregion PR3 is then read and used as a first frequency f1 to therewith conduct the above detection.

As described above, detection of relationships A or B is repeatedly conducted with the first frequency f1 fixed to one of the above selected frequencies and the second frequency f2 being sequentially substituted by the other selected frequencies in the order of a smaller number of relevant preset subregions (one round). After one round of detection is completed, another round of detection is conducted with the first frequency f1 fixed to the next frequency and the second frequency f2 being sequentially substituted by the other frequencies. Repetition of the above detection reveals frequency relationship among all of the preset stations.

It should be noted that, in this repetition, respective frequencies are substituted to the first or second frequency f1 or f2 in the order of the smaller number of relevant preset subregions. Also, every time a first frequency f1 is changed, a frequency relative to a preset subregion next to the preset subregion relative to the frequency which is newly selected as the first frequency f1, may initially be used as the second frequency f2. With this arrangement, duplication in selected stations can be avoided so that efficient detection can be achieved.

As is shown in FIG. 5, the relationship "f1−fr=f2−f1" is held with the station r5 for the first frequency f1 and the station r4 for the second frequency f2. Thus, after repetition of the above detection processes using different frequencies for the first and second frequencies fud1, fud2, the control circuit detects at S8 and S10 that the relationship A and B hold between the object station r1 and the disturbance stations r4 and r5. Note that the stations r4 and r5 both have frequencies higher than the frequency of the station r1.

When relationship A holds, mutual modulation disturbance can be expected. Therefore, the control circuit 10 generates a sensitivity adjustment signal d so as to enhance the sensitivity of the RF-AGC circuit 8. With enhanced sensitivity, the RF-AGC loop promptly responds to the harmonic due to the disturbance stations r4 and r5. Then, the RF amplifier 1 reduces its gain upon detection of the harmonic, so that an RF signal is suppressed (S13). After the sensitivity of the RF-AGC circuit 8 is enhanced, the control circuit 10 generates a local oscillation control signal a corresponding to the station r1, the data of which has been set in the preset region PR1. In response to the signal a, the local oscillation signal is adjusted to have a frequency corresponding to the station r1, so that the RF signal of the station r1 alone is converted into a predetermined IF signal through frequency conversion, and then supplied for FM detection (S14).

In the above procedure, when the control circuit 10 detects that the immediately proceeding detection as to frequency relationship between the stations r1 and r2 to r6 is deemed to be the final detection (S11), the control circuit 10 does not generates a sensitivity adjustment signal d. Therefore, the sensitivity of the RF-AGC circuit 8 remains low, so that occurrence of an unnecessary AGC operation can be prevented (S15). Thereafter, the operation process moves to S14, where the radio receiver receives the station r1.

As described above, when an automatic memory function is utilized, frequency and field intensity information of a station with high field intensity can be obtained. Thus, since it is possible to detect stations retaining such frequency relationship that may possibly cause mutual modulation disturbance with respect to an object station, occurrence of mutual modulation disturbance can be precisely prevented by enhancing the AGC sensitivity before reception of an object station. Note that, alternatively, station data may be preset in preset subregions in the order of frequencies, not just in the order of higher field intensity as described in the above.

For stations r3, r5, the control circuit 10 does not enhance the RF-AGC circuit 8 with the judgement that those stations r3, r5 do not cause mutual modulation disturbance with respect to the station r1. This is because, although the intervals between the stations r1 and r3, and r1 and r5 are equal to each other, the stations r1, r3, r5 are not in relationship B, as the stations r3 and r5 are respectively preset on the lower and higher frequency sides with respect to the station r1.

Figure 6:
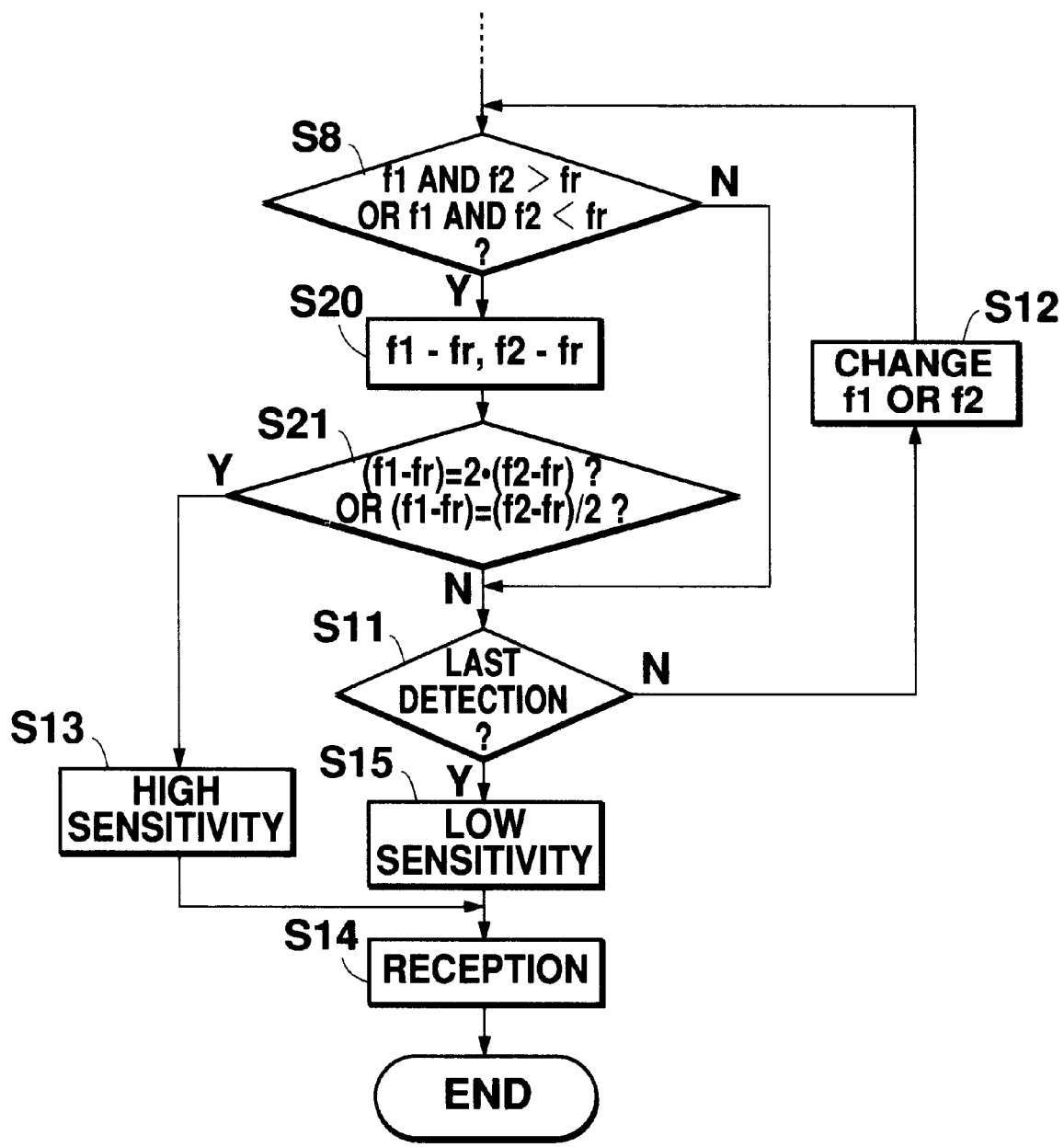
FIG. 6 is a flowchart of the other operation of the device of FIG. 3.

FIG. 6 is a flowchart of another operation for detecting stations which may cause mutual modulation disturbance. Note that identical steps to those in the flowchart of FIG. 4 are not explained here.

At S8, the control circuit 10 reads frequency data of the station r1 as a reference frequency fr, that of the station r2 as a first frequency f1, and that of the station r3 as a second frequency f2. Then, the control circuit 10 detects whether or not the relationship A, namely, "f1>fr and f2>fr" or "f1<fr and f2<fr" holds among these stations (S8).

As the first and second frequencies f1 and f2 are lower than the reference frequency fr, the control circuit 10 calculates the frequency difference between the reference frequency fr and the first frequency f1, and uses the calculated frequency difference as a third value (f1−fr). The circuit 10 further calculates the frequency difference between the reference frequency fr and the second frequency f2 and uses the calculated frequency difference as a fourth value (f2−fr) (S20). The control circuit 7 compares the third and fourth values to see whether or not they hold the relationship c, namely "fr−f1=2×(f2−fr) or "fr−f1=(f2−fr)/2" (S21).

It is known from FIG. 1 that mutual modulation disturbance may occur when the frequency difference between an object station fd and a disturbance station fud2 is twice as large as that between the object station fr and the disturbance station fud1. In other words, mutual modulation disturbance may occur when the frequency difference between an object station fr and the disturbance station fud1 is a half of that between the object station fr and the disturbance station fud2. Thus, whether or not mutual modulation disturbance may occur can be known through detection as to whether or not the relationship c holds.

When the relationship c holds, the operation process moves to S13, where the sensitivity of the RF-AGC circuit 8 is enhanced before the station r1 is received at S14.

When the relationship C does not hold, on the other hand, the operating process moves to S11, where the above detection is repeatedly conducted while sequentially substituting the respective frequencies to the first and/or second frequencies.

According to the present invention, there can be provided a radio receiver which can store data on stations having field intensity at more than predetermined level. In such a receiver, stations which may cause mutual modulation disturbance with respect to an object station are detected with reference to the frequency information stored in the memory, and the RF-AGC sensitivity is enhanced only when such a station is detected. If such a station is not present, the RF-AGC sensitivity may remain low, so that unnecessary sensitivity suppression with respect to an object station is not conducted.

While there has been described what is at present considered to be the preferred embodiment of the present invention, it will be understood that various modifications may be made thereto, and it is intended that the appended claims cover all such modifications as fall within the true spirit and scope of the invention.

What is claimed is:

1. A radio receiver including an AGC loop reducing a level of an RF signal according to received field intensity, and a memory function for storing frequencies of a number of stations having field intensity higher than a predetermined level, comprising:

detection means for calculating a frequency difference based on said frequencies of the number of stations, and detecting a station having such a frequency relationship with an object station that may cause mutual demodulation disturbance with respect to the object station, based on the calculated frequency difference; and sensitivity changing means for enhancing sensitivity of the AGC loop in response to an output signal of the detection means.

2. A radio receiver including an AGC loop reducing a level of an RF signal according to received field intensity, and a memory function for storing frequencies of a number of stations having field intensity higher than a predetermined level, comprising:

detection means for calculating a frequency difference based on said frequencies of the number of stations, and detecting a station having such a frequency relationship with an object station that may cause mutual demodulation disturbance with respect to the object station, based on the calculated frequency difference; and sensitivity changing means for enhancing sensitivity of the AGC loop in response to an output signal of the detection means; wherein the detection means includes;

first calculation means for calculating and using as a first value, a frequency difference between the object station selected from among the number of stations and another station selected from among the number of stations;

second calculation means for calculating and using as a second value, a frequency difference between the another station and yet another station selected from among the number of stations; and determination means for determining whether or not the first value is equal to the second value, wherein the sensitivity of the AGC loop is enhanced when the first value is determined to be equal to the second value.

3. A radio receiver according to claim 2, wherein the detection means further includes frequency detection means for detecting whether or not frequencies of the another station and the yet another station are both higher or lower than a frequency of the object station.

4. A radio receiver including an AGC loop reducing a level of an RF signal according to received field intensity, and a memory function for storing frequencies of a number of stations having field intensity higher than a predetermined level comprising:

detection means for calculating a frequency difference based on said frequencies of the number of stations and detecting a station having such a frequency relationship with an object station that may cause mutual demodulation disturbance with respect to the object station based on the calculated frequency difference; and sensitivity changing means for enhancing sensitivity of the AGC loop in response to an output signal of the detection means: wherein the detection means includes first calculation means for calculating and using as a first value, a frequency difference between the object station selected from among the number of stations, and another station selected from among the number of stations;

second calculation means for calculating and using as a second value, a frequency difference between the object station and yet another station selected from among the number of stations; and determination means for determining whether or not the second value is twice as large as or half of the first value, wherein the sensitivity of the AGC loop is enhanced when the second value is determined to be twice as large as or half of the first value.

5. A radio receiver according to claim 3, wherein the detection means further includes frequency detection means for detecting whether or not frequencies of the another station and the yet another station are both higher or lower than a frequency of the object station.

6. An AGC loop sensitivity control method used in a radio receiver including an AGC loop reducing a level of an RF signal according to received field intensity, and a memory function for storing frequencies of a number of stations having field intensity higher than a predetermined level, comprising:

a detection step of calculating a frequency difference based on said frequencies of the number of stations, and detecting a disturbance station having such a frequency relationship with an object station that may cause mutual demodulation disturbance with respect to the object station, based on the calculated frequency difference; and a sensitivity changing step of enhancing sensitivity of the AGC loop in response to an output signal of the detection means.

7. An AGC loop sensitivity control method used in a radio receiver including an AGC loop reducing a level of an RF signal according to received field intensity, and a memory function for storing frequencies of a number of stations having field intensity higher than a predetermined level, comprising:

a detection step of calculating a frequency difference based on said frequencies of the number of stations and detecting a disturbance station having such a frequency relationship with an object station that may cause mutual demodulation disturbance with respect to the object station, based on the calculated frequency difference; and a sensitivity changing step of enhancing sensitivity of the AGC loop in response to a result obtained in the detection step; wherein the detection step includes:
 a selection step of selecting an object station from among the number of stations;
 a selection step of selecting a first candidate station from among the number of stations excluding the object station;
 a first calculation step of calculating and using as a first value, a frequency difference between the object station and the first candidate station;
 a selection step of selecting a second candidate station from among the number of stations excluding the object station and the first candidate station;
 a second calculation step of calculating and using as a second value, a frequency difference between the first candidate station and the second candidate station;
 a frequency interval comparison step of detecting whether or not the first value is equal to the second value; and
 a determination step of determining that the first candidate station and the second candidate station are the disturbance station, based on a result obtained at the frequency interval comparison step.

8. An AGC loop sensitivity control method according to claim 7, wherein the detection step further includes:
a frequency comparison step of detecting whether or not frequencies of the first candidate station and the second candidate station are either both higher or both lower than a frequency of the object station; wherein
the first candidate station and the second candidate station are determined as the disturbance station, based on results obtained at the frequency interval comparison step and the frequency comparison step, in the determination step.

9. An AGC loop sensitivity control method used in a radio receiver including an AGC loop reducing a level of an RF signal according to received field intensity, and a memory function for storing frequencies of a number of stations having field intensity higher than a predetermined level, comprising:

a detection step of calculating a frequency difference based on said frequencies of the number of stations and detecting a disturbance station having such a frequency relationship with an object station that may cause mutual demodulation disturbance with respect to the object station based on the calculated frequency difference; and a sensitivity changing step of enhancing sensitivity of the AGC loop in response to a result obtained in the detection step; wherein the detection step includes:
 a selection step of selecting an object station from among the number of stations;
 a selection step of selecting a first candidate station from among the number of stations excluding the object station;
 a first calculation step of calculating and using as a first value, a frequency difference between the object station and the first candidate station;
 a selection step of selecting a second candidate station from among the number of stations excluding the object station and the first candidate station;
 a second calculation step of calculating and using as a second value, a frequency difference between the object station and the second candidate station;
 a frequency interval comparison step of detecting whether or not either of the first value or the second value is twice as large as the other; and
 a determination step of determining that the first candidate station and the second candidate station are the disturbance station based on a result obtained at the frequency interval comparison step.

10. An AGC loop sensitivity control method according to claim 9, wherein the detection step further includes:
a frequency comparison step of detecting whether or not frequencies of the first candidate station and the second candidate station are either both higher or both lower than a frequency of the object station; wherein
the first candidate station and the second candidate station are determined as the disturbance station, based on results obtained at the frequency interval comparison step and the frequency comparison step, in the determination step.

* * * * *